March 22, 1955 E. J. MARTIN ET AL 2,704,825
CABLE INSULATION TESTER
Filed Nov. 4, 1948 2 Sheets-Sheet 2

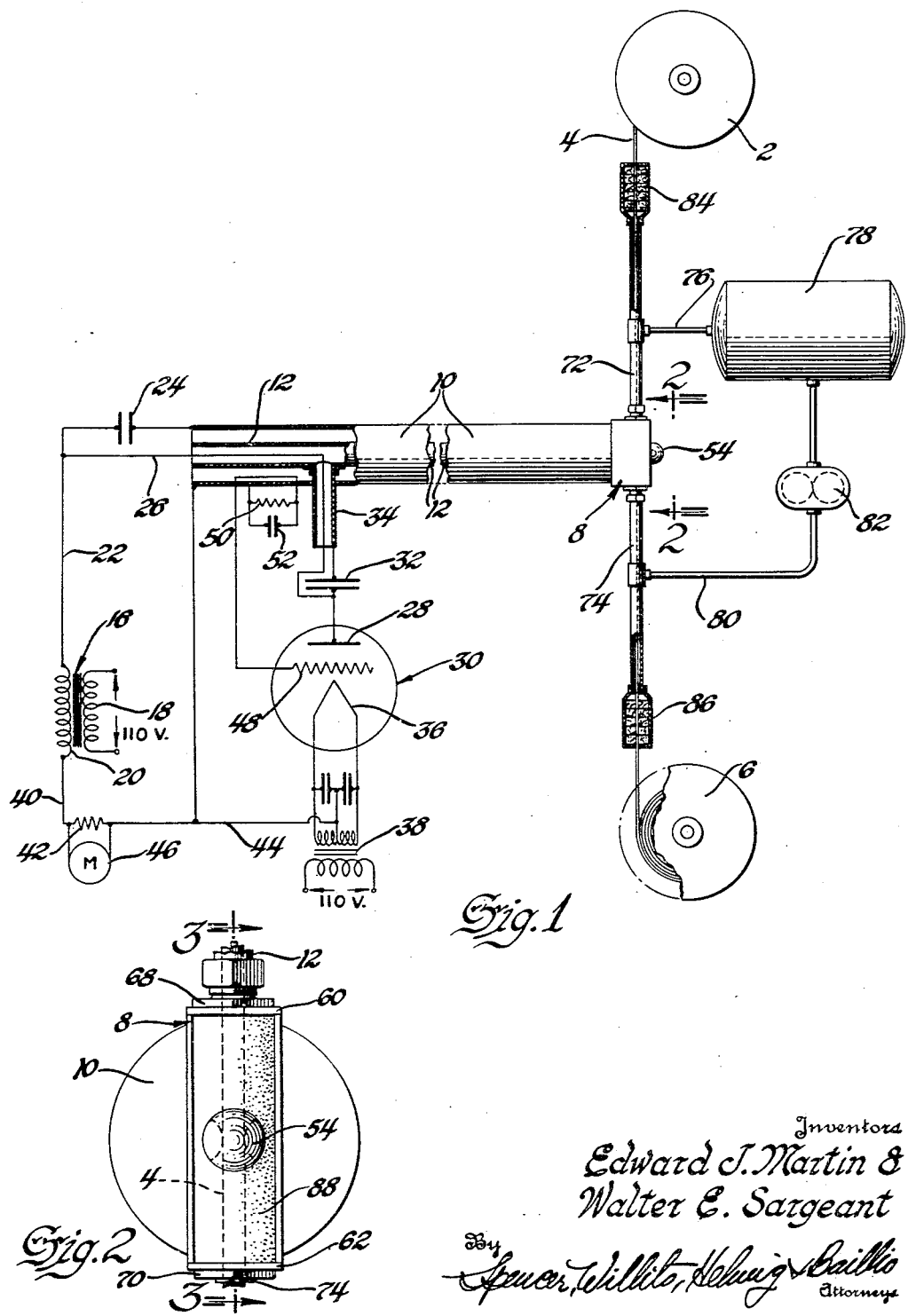

Inventors
Edward J. Martin &
Walter E. Sargeant
By Spencer, Willits, Helwig & Bailko
Attorneys United States Patent Office 2,704,825
Patented Mar. 22, 1955

1

2,704,825

CABLE INSULATION TESTER

Edward J. Martin, Pleasant Ridge, and Walter E. Sargeant, Huntington Woods, Mich., assignors to General Motors Corporation, Detroit, Mich., a corporation of Delaware Application November 4, 1948, Serial No. 58,204

7 Claims. (Cl. 324—54)

This invention relates to a method and means for testing electrical insulation, and more particularly to a method and means for testing the insulating properties of the covering material on cables designed to carry high voltages. While means for applying breakdown or high voltages to insulation on wire or cable to test the same are conventional, the majority of these testing methods utilize high voltage 60 cycle current which is applied to a cable under test, wrapped around a conductive mandrel of some type, the latter being grounded. If the insulation is faulty, conduction occurs between the cable core and the mandrel or ground. It is obvious that with this method only one side of the wire or cable insulation is in contact with the mandrel. The remainder of the periphery or circumference being at varying distances therefrom, if a fault occurs in the surface of the insulation which is on the outside or farthest away from the mandrel, the air path may form sufficient insulation to prevent discharge to ground, where otherwise if this surface was in contact with the mandrel a discharge would take place and under such conditions a faulty cable may actually be approved. In order to avoid such a situation, some means should be provided to apply the test voltage equally around the circumference of the cable.

Cables which are designed to carry a certain maximum 60 cycle voltage also have applied thereto under certain operating conditions surges of high frequency voltage, and it is well known that sometimes such surges of high frequency voltage of a lower actual value than the normal rated 60 cycle voltage may cause a breakdown of the insulation. It is, therefore, desirable to test the insulation with high frequency voltage so that any faults which are inherent in the cable for high frequency current may be located. Furthermore, in applying a high or test voltage to the circumference of the cable to test the insulation, there is a tendency for this voltage to concentrate at the edge of a ring or circular applicator which would surround the circumference of the cable. This concentration may be sufficient to cause a corona discharge at this edge which might burn the insulation. It is, therefore, desirable to spread or fan out the equipotential lines to avoid this difficulty.

It is, therefore, an object of our invention to provide high frequency cable insulation testing means.

It is a further object of our invention to provide cable insulation testing means which applies test voltage equally around the circumference of the cable.

It is a still further object of our invention to provide cable testing means capable of spreading or fanning the equipotential lines of voltage out so that they cover an appreciable length of the cable to avoid concentration at a plane which might cause corona burns.

It is a still further object of our invention to provide high frequency insulation testing means for cables which utilizes a minimum power requirement.

With these and other objects in view which will become apparent as the specification proceeds, our invention will be best understood by reference to the following specification and claims and the illustrations in the accompanying drawings, in which:

Figure 1 is a diagrammatic view showing our invention with parts being broken away and shown in section.

Figure 2 is a vertical end view of the test head of our invention taken on line 2—2 of Figure 1.

Figure 3:
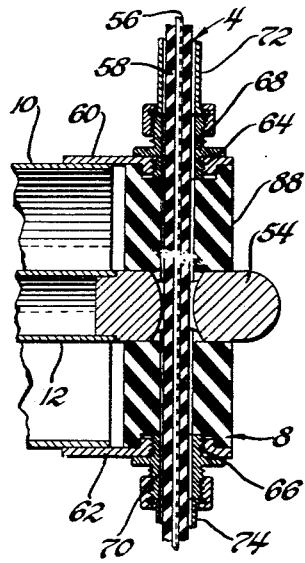
Figure 3 is a sectional view taken on line 3—3 of Figure 2.

Referring now more particularly to that form of our invention shown in Figures 1, 2 and 3 inclusive, a large drum 2 supports a supply of cable 4 which is to be tested. This cable feeds down through testing apparatus to be described, and is wound on storage drum 6 after it has passed through the test equipment. The test equipment in this particular case consists of a test head 8 through which the cable is drawn. This test head is supplied with high frequency current through a concentric cable formed of an outside tubular conductor 10 and an inside conductor 12. A transformer 16 having its primary 18 connected to the conventional 110 volt A. C. source has its secondary 20 connected through line 22 and condenser 24 to the outer concentric conductor 10. Line 22 is also connected through tie line 26 directly to the plate 28 of the oscillator tube 30. The plate also is connected through condenser 32 to the inner conductor 12 of the concentric cable by tap 34. The filament 36 of the oscillator tube is supplied by current through a filament transformer 38 in like manner connected to the conventional 110 volt source. A conductor 40 is connected to secondary 20 of transformer 16 and thence to resistor 42, the opposite side of the resistor being connected through conductor 44 with the center tap on the secondary of the transformer 38, and likewise to the outside conductor of the concentric cable 10. A recording meter 46 is connected across resistor 42 and operates by the potential drop thereacross. The control grid 48 of the oscillator tube 30 is connected through a resistance 50 and a condenser 52 in parallel, whose opposite terminal is connected to the conductor 10. Through this portion of the device there is impressed upon the concentric cable consisting of conductors 10 and 12 a high frequency, high voltage current to be used in testing the cable insulation.

In general, the remaining portion of the test equipment is so provided that the cable is drawn down through a circular opening to which this test voltage is applied, during which operation the cable is surrounded by a suitable dielectric such, for example, as distilled water, and is then pulled out of the test equipment to a storage reel. The test head is best shown in Figure 3 and consists of a ring conductor 54 through which the cable 4, consisting of a core 56 and an insulating covering 58, is drawn. This ring is rigidly secured to the end of the inner concentric conductor tube 12, which is the high voltage lead. The outer conductor tube, which is grounded, is connected on opposite sides to two conductive spaced plates 60 and 62, which have diametrically aligned openings 64 and 66 therein through which the cable is to be fed. These openings 64 and 66 are both threaded and pipe fittings 68 and 70 are secured thereto having an internal diameter sufficient to accommodate the cable plus an area through which the water or other dielectric may flow, the fittings being secured to the ends of pipes 72 and 74 which extend axially in opposite directions along the path of the cable.

The upper pipe 72 has a tap connection 76 which extends directly to a storage tank 78 for storing any suitable dielectric material, the lower pipe 74 having a similar tap and connecting line 80 extending to a pump 82 in turn connected back to the storage tank. Upper pipe 72 terminates in a packing gland 84 through which the cable enters and lower pipe 74 likewise terminates in a packing gland 86 through which the cable makes its exit. Between the upper plate 60 and the lower plate 62 is a substantially cylindrical jacket 88 which encloses the cable and the ring conductor between these two end plates and restrains the dielectric liquid to close proximity with the cable. This jacket may be formed of polystyrene or some similar substance. The voltage difference between the ring 54 and the core of the cable is the test voltage, the core being grounded by the capacity between the core and the outer tube which is an effective ground at high frequencies.

In operation the pump is energized to continuously feed the dielectric which may be distilled water through the closed system comprising the tank feed lines 76 and 72 so that water totally encircles or encompasses the cable 4 as it feeds through the jacket and test ring 54. The water then is pumped back into the tank through return pipe 74 and pipe 80. At the same time high frequency, high voltage current is being applied between conductors 10 and 12 which terminate in conductive plates 60 and 62 and ring 54. By the use of this equipment test voltage is applied totally around the circumference of the cable as it passes through the ring 54 so that there can be no surface which is not tested, and by the use of high frequency current the cable is tested against any possible high frequency surges that might cause breakdown, and lastly, the dielectric flowing along the sides of the cable as it is tested tends to further distribute or fan out the equipotential lines between the test voltage terminals and spread out the voltage as applied to the cable so that a critical voltage drop will not occur at the rim of the ring.

Figure 4:
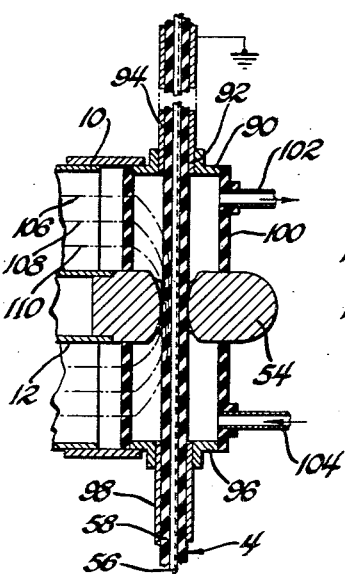
Figure 4 is a view similar to Figure 3 of a modified form of test head including an equipotential line chart.

There are, of course, various modifications in the form which the test head per se may take, and one of these is illustrated in Figure 4. In that instance the same concentric cable high frequency power supply is used as shown at 10 and 12, and the same voltage ring applicator 54. In this case, however, the upper supporting conductor plate 90 has a central opening 92 to support a circular tubular guide 94 for the cable of approximately the same inside diameter as that of the cable, which guide is formed of a conducting material such as copper and is grounded as shown. The lower supporting plate 96, in like manner carried by the outside concentric conductor 10, supports an outlet guide 98 of the same character as 94. The dielectric in this case is fed into a hollow circular jacket 100 supported between these two plates 90 and 96 and may be any of various types of dielectric including air which is supplied through input pipe 104 and removed through exit pipe 102. This jacket 100, as in the former instance, is made of polystyrene or some similar substance.

Figure 5:
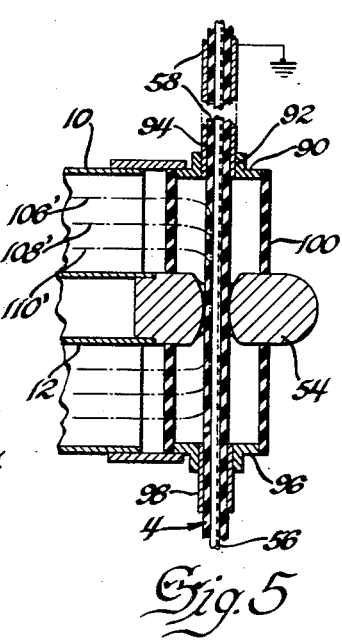
Figure 5 is a view similar to Figure 4 showing the voltage line chart for a different dielectric in the jacket.

When air is used as a dielectric, the equipotential line chart shown in dash and dotted lines in Figure 4 is the result, and it will be seen that the voltages are quite well fanned out or spread through the insulation and are not concentrated at any particular given point. As an example of voltages which would appear if 10,000 volts were applied between the outer member 10 and the inner member 12, then dash and dotted line 106 would represent some 2500 volts; line 108, 5,000 volts; line 110, 7,500 volts; and of course the inner conductor the full 10,000. These are only, of course, illustrative of any values of voltage which might be applied. If by using the same construction and substituting a liquid such as distilled water instead of air into the jacket 100, then the equipotential lines 106, 108 and 110 would be further spread out or fanned, as shown at 106', 108' and 110' of Figure 5. In other words, Figure 5 shows the same assembly as Figure 4 but with water or other higher dielectric substituted for air.

Figure 6:
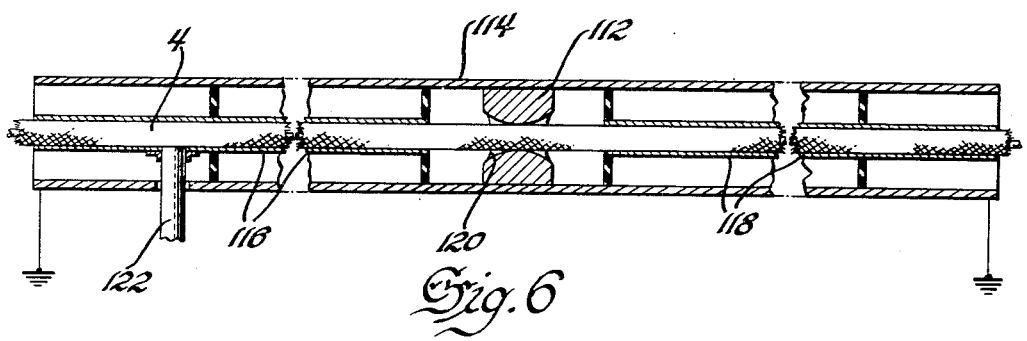
Figure 6 is a vertical section through a modified form of test device.
Figure 7:
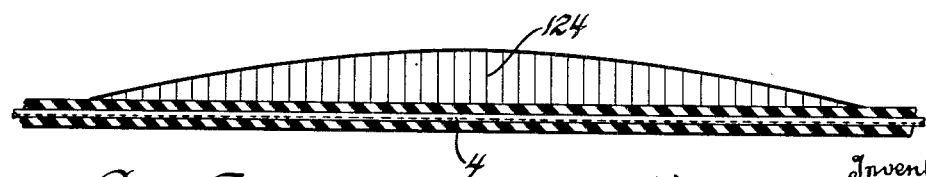
Figure 7 is a chart illustrating the voltage values applied to the cable in the testing device shown in Figure 6.

It is also possible to invert the supply of power; that is, to apply power to the cable and ground the annular ring such as 54, and such a modification is shown in Figure 6. In that case a concentric cable of one quarter wave length on each side of a circular ring 112 is provided, said concentric cable being formed of a single outer circular conductor 114 and two smaller concentric internal conductors 116 and 118, the latter being supported in insulated relation within the larger. The cable 4 to be tested is adapted to be fed through the inner tubular conductors 116 and 118 and through a tapered opening 120 in the ring 112. This cable is adapted to be supplied with power through conductor 122 from a high frequency power source to tubular conductor 116 and thence inductively and capacitatively fed to the cable. The outside conductor 114 is, as shown, grounded. Therefore, with one quarter wave length resonators on the input side, a high voltage may be easily generated with a minimum of power to test the cable in this manner. Figure 7 is a diagrammatic showing of the values of the test voltage applied to the cable 4 as it is fed through the testing equipment shown in Figure 6. The height of the line 124 illustrated the relative values of the voltages applied along the length of the cable.

We claim:

1. In means for testing the insulating properties of the covering on cables, a concentric cable formed of inner and outer tubular members insulated from each other, said inner tubular member being discontinuous and having one length of one quarter of the wave length of the applied frequency, a source of high frequency power connected to said inner tubular member, an annular electrode having a flared opening therein mounted inside and electrically connected to the outer tubular member between the two inner sections, the cable to be tested being fed through the inner members and the opening in the annular electrode so that the test voltage is inductively and capacitatively fed to the cable and the insulation tested at the annular electrode.

2. In means for testing the insulating properties of the covering on an electrically conductive cable, an elongated grounded tubular member, a plurality of smaller tubular members insulatedly mounted in spaced aligned relation within said grounded tubular member, an apertured member mounted within said grounded tubular member between the ends of the smaller tubular members and having its aperture in alignment therewith, and a source of high frequency power connected to one of the smaller tubular members whose length is such as to be one-quarter of the wave length of the applied frequency to provide a test voltage for a cable drawn through the smaller tubular members and the apertured member.

3. Apparatus for testing the insulating properties of electrical cable comprising, in combination, a test head through which said cable being tested is passed said test head including a tubular outer conductor and an inner conductor concentrically disposed within and electrically insulated from said outer conductor, and a conductive apertured electrode mounted within said test head and electrically connected to one of said conductors for receiving said electrical cable being fed through the test head, a source of high frequency power connected between said conductors of said test head, and indicating means connected in circuit with said test head.

4. Apparatus for testing the insulating properties of electrical cable comprising, in combination, a test head through which said cable being tested is passed, said test head including a tubular outer conductor and a discontinuous tubular inner conductor concentrically disposed within and electrically insulated from said outer conductor, a conductive apertured electrode mounted within said test head and electrically connected to one of the conductors thereof for receiving said electrical cable being fed through the test head, a source of high frequency power connected in circuit between said conductors of said test head for subjecting the insulation covering the electrical cable under test to a high frequency field equally distributed around the circumference thereof, and indicating means connected in circuit with said test head and said high frequency power source.

5. Apparatus for testing the insulating properties of electrical cable comprising in combination, a test head through which said cable being tested is passed, said test head including a tubular outer conductor and a discontinuous inner conductor concentrically disposed within and electrically insulated from said outer conductor, said inner conductor comprising a plurality of axially spaced tubular conductor sections, and a conductive apertured electrode mounted within and electrically connected to said outer conductor of said test head between the adjacent ends of a pair of axially spaced sections of said discontinuous inner conductor for receiving said electrical cable being fed through the said sections of said inner tubular conductor of said test head, a source of high frequency power connected in circuit between said outer conductor and one of the said axially spaced sections of said inner conductor of said test head for subjecting the insulation covering the electrical cable under test to a high frequency field, and indicating means connected in circuit with said test head and said high frequency power source.

6. A high frequency test head for testing the insulating properties of electrical cable passed through said test head, comprising, in combination, a tubular outer conductor and a discontinuous tubular inner conductor concentrically disposed within and electrically insulated from said outer conductor, said inner conductor comprising a plurality of axially spaced tubular conductor sections and a conductive apertured electrode mounted within and electrically connected to said outer conductor of said test head between the adjacent ends of a pair of the said axially spaced sections of the test head, one of said axially spaced tubular sections of said discontinuous inner conductor forming a part of a resonant coaxial line with said outer conductor at the frequency at which said electrical cable is to be tested.

7. A high frequency test head for testing the insulating properties of electrical cable passed through said test head, comprising a tubular outer conductor and a discontinuous inner conductor concentrically disposed within and electrically insulated from said outer conductor, said inner conductor comprising a plurality of axially spaced tubular conductor sections and a conductive apertured electrode mounted within and electrically connected to said outer conductor of said test head between the spaced adjacent ends of a pair of the said axially spaced sections of said discontinuous inner conductor, at least one of said axially spaced tubular sections of said discontinuous inner conductor having a length substantially one-quarter of the wave-length of the frequency at which said electrical cable is to be tested.

References Cited in the file of this patent

UNITED STATES PATENTS

| | | |
|---|---|---|
| 2,280,119 | Gorman et al. | Apr. 21, 1942 |
| 2,452,624 | Zimmermann | Nov. 2, 1948 |
| 2,456,012 | Muskat et al. | Dec. 14, 1948 |
| 2,460,107 | Slade | Jan. 25, 1949 |
| 2,474,260 | Leef | June 28, 1949 |
| 2,485,871 | Entwistle | Oct. 25, 1949 |
| 2,567,921 | Boehm, Jr. | Sept. 18, 1951 |